United States Patent [19]

Sigmund

[11] 4,375,121

[45] Mar. 1, 1983

[54] DYNAMIC FRICTION INDICATOR AND TIGHTENING SYSTEM USABLE THEREWITH

[75] Inventor: Jerry A. Sigmund, Merion Station, Pa.

[73] Assignee: SPS Technologies, Jenkintown, Pa.

[21] Appl. No.: 137,948

[22] Filed: Apr. 7, 1980

[51] Int. Cl.[3] .................... B23Q 17/00; B23P 19/04

[52] U.S. Cl. .................................... 29/407; 29/240; 73/761; 73/862.23; 173/12; 364/505; 364/508

[58] Field of Search .................... 29/240, 407; 73/139, 73/761; 173/12; 364/505, 507, 508, 468; 81/467

[56] References Cited

U.S. PATENT DOCUMENTS

| | | | |
|---|---|---|---|
| 3,982,419 | 9/1976 | Boys . | |
| 4,000,782 | 1/1977 | Finkelston | 73/139 X |
| 4,104,778 | 8/1978 | Vliet . | |
| 4,104,780 | 8/1978 | Sigmund . | |
| 4,163,310 | 8/1979 | Sigmund | 29/407 |
| 4,179,786 | 12/1979 | Eshghy | 29/240 X |

*Primary Examiner*—Francis S. Husar
*Assistant Examiner*—Carl J. Arbes
*Attorney, Agent, or Firm*—Aaron Nerenberg

[57] ABSTRACT

Apparatus and method for determining dynamic friction in a threaded joint and an associated tightening system for tightening such joints including threaded fasteners. A value representative of the coefficient of friction in the threaded joint is obtained by determining the gradient of a torque-rotation curve which could be plotted for the joint being tightened, and dividing this gradient by the product of the fastener pitch diameter and the tension rate of the joint. The desired tightened condition is achieved by computing the tightening torque required to induce a predetermined preload in the threaded fastener and comparing this computed torque with the instantaneous torque being imparted to the fastener. When the two torques are equal, tightening of the fastener is stopped. The desired tightening torque may be computed by obtaining the product of the value representative of the coefficient of friction, the predetermined preload and the pitch diameter of the fastener, or alternatively, by obtaining the product of the gradient of the torque-rotation curve and the quotient of the predetermined preload divided by the tension rate of the joint.

22 Claims, 3 Drawing Figures

DYNAMIC FRICTION INDICATOR AND TIGHTENING SYSTEM USABLE THEREWITH

DESCRIPTION

Technical Field

The present invention relates, in general, to the determination of friction in a joint and the associated tightening of assemblies and, in particular, to an apparatus and method for determining a value representative of the coefficient of friction in a threaded joint and tightening systems for joints which are held together by threaded fasteners.

BACKGROUND OF THE INVENTION

Heretofore, apparatus and a method for determining dynamic friction in a threaded joint during an actual tightening operation was unknown. Accordingly, apparatus and a method utilizing a determined dynamic friction value for tightening threaded joints to a precise clamping load has not been available. The precise clamping load of a threaded fastener is extremely important in determining whether or not a joint, including the fastener, will fail in service. Consequently, threaded fasteners should be installed in a controlled manner, whereby the clamping load required to maintain the integrity of the joint is achieved.

One common technique for controlling the tightening of threaded fasteners is to use torque control apparatus by which a specific predetermined torque is applied in an attempt to attain a desired preload for particular thread and frictional conditions. Such an approach has the disadvantage that there may be variations in the torque/tension relationship from one tightening cycle to the next for the same assembly or same type of assembly due to different friction conditions from joint to joint, whereby clamping loads varying by as much as ±30% may be produced for a given applied torque.

Another known technique which is not dependent upon frictional conditions involves measuring the elongation of the fastener as the assembly is tightened. While this approach is capable of developing the accuracy required to achieve the desired clamping load, as a practical matter, in most cases direct measurement of elongation is either impossible or commercially unfeasible.

Yet another tightening technique which has been employed in the past in installing threaded fasteners is based on angle control. Given an estimate of fastener elongation required to achieve a desired clamping load, the threaded fastener is turned through a precise angle of tightening which will produce the necessary elongation. The disadvantage of this approach results from the difficulty in identifying the initiation point for the measurement of rotation of the fastener to produce the desired clamping load. U.S. Pat. Nos. 4,104,778 and 4,104,780 are directed to this technique and address the problem of identifying the point for initiating the measurement of rotation.

U.S. Pat. No. 3,982,419 is directed to an apparatus and method which involve tightening threaded fasteners into the yield region of the fasteners. Under such conditions, the disadvantages of the other techniques described above are avoided and the integrity of the assembly is greatly enhanced. There are, however, applications where the threaded fastener preferably is tightened to some point within its elastic range. For example, in the installation of certain high strength bolts, tightening to some clamping load below the elastic limit of the fastener will provide the desired tightened condition.

SUMMARY OF THE INVENTION

Accordingly, it is an object of the present invention to provide a new and improved apparatus and method for determining a value representative of the friction in a threaded joint.

It is another object of the present invention to provide a new and improved apparatus and method for tightening a joint including a threaded fastener.

It is still another object of the present invention to provide an apparatus and method for tightening a joint including a threaded fastener which involve tightening the fastener to a clamping load within its elastic range.

It is yet another object of the present invention to provide an apparatus and method for tightening a joint including a threaded fastener which are relatively accurate and efficient, and require a minimum amount of prior knowlege about the joint.

In accordance with the technique employed in the present invention, the value representative of the friction in the threaded joint for the fastener assembly being tightened is obtained. Thereafter, the desired tightened condition of the assembly is achieved by imparting a computed amount of torque for the particular fastener being installed to induce the desired preload in the fastener. This result is obtained by utilizing the relationship between the actual torque-rotation curve for the assembly being tightened and the predetermined preload-rotation curve for the assembly.

In accordance with the apparatus and method of the present invention, gradient calculating means are provided for determining the gradient of a torque-rotation curve which could be plotted for the joint being tightened. Means for providing a predetermined constant representative of the product of the fastener pitch diameter and the tension rate of the joint are included. Computing means receiving the gradient signal and the predetermined constant provide a signal whose value is indicative of the coefficient of friction in the joint. The desired tightened condition of the joint is achieved by computing means which calculate the tightening torque required to induce the predetermined preload in the threaded fastener and comparator means which compare the computed torque with the instantaneous torque being imparted to the fastener. When the two torques are equal, a control signal is developed for stopping tightening of the fastener.

BRIEF DESCRIPTION OF THE DRAWINGS

Referring to the drawings.

DETAILED DESCRIPTION OF THE PREFERRED EMBODIMENT

Figure 1:
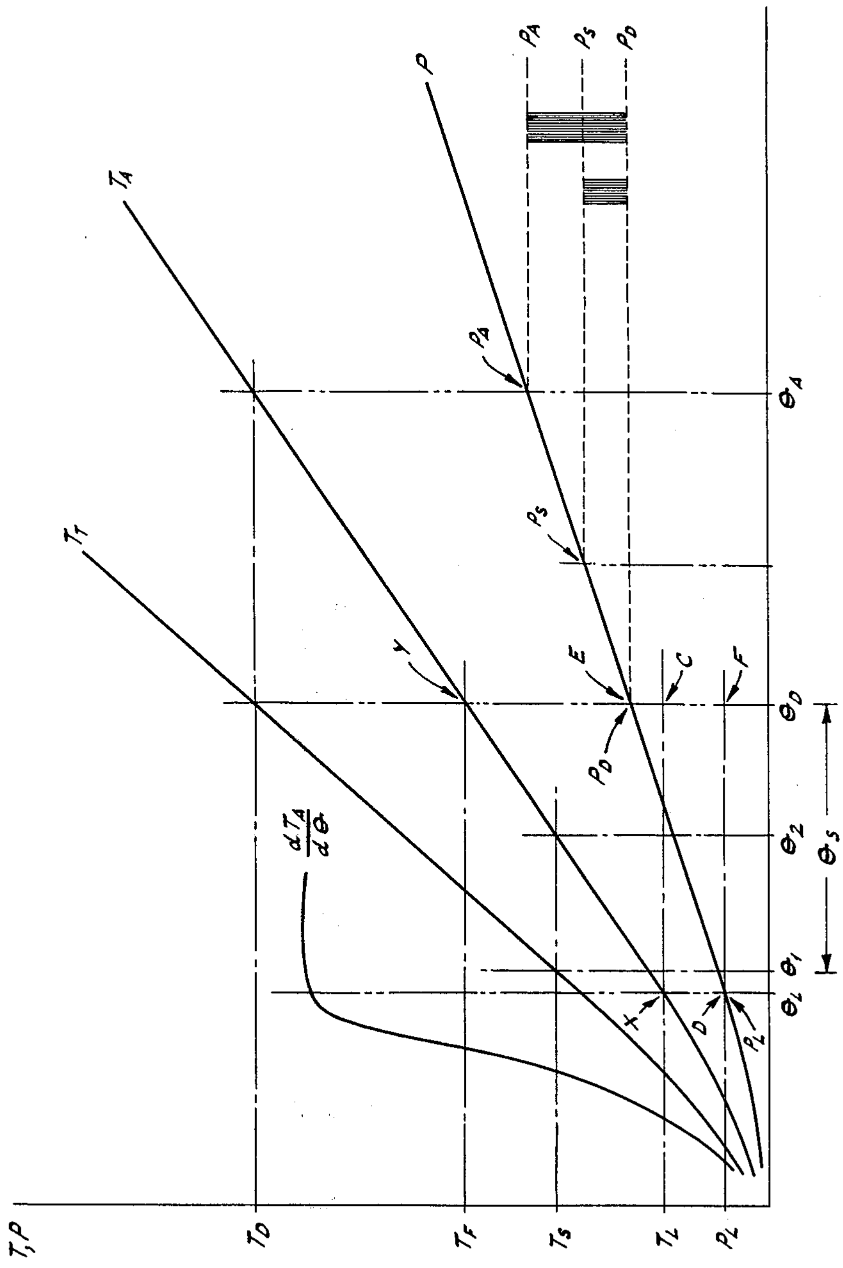
FIG. 1 shows the idealized tightening curves associated with a typical assembly held together by a threaded fastener and the manner in which a desired, predetermined preload is induced in the fastener, in accordance with the present invention, to achieve a properly tightened condition for the assembly.

Referring to FIG. 1, the tightening curves which are illustrated are idealized in that they are shown to have smooth and linear portions, when, in fact, under practical conditions they are somewhat irregular due to electrical and mechanical noise and the linear portions typically are, at best, substantially linear. The principles of the present invention may be most readily understood by dealing with idealized curves. Although the differences between ideal and practical conditions are well understood by those skilled in the art, the description of the invention will make reference to the manner in which certain practical effects may be handled.

The curve identified by P is a preload-rotation curve and $P_D$ represents, for example, a desired, predetermined preload which is to be induced in the threaded fastener when the assembly has been tightened to the desired value. This curve may be derived either by calculation or experimentation. Normally, curve P is derived by actual measurements of preload induced in a fastener in a sample joint assembly including a strain-gaged bolt, as it is being tightened. Given the physical characteristics of the assembly, including the threaded fastener, curve P may also be derived from the equation which defines the preload versus angle relationship, $P=K\theta$, for the linear portion of the curve.

As an illustration of the tightening of a typical joint, the curve identified by $T_T$ is a theoretical torque-rotation curve for the assembly. This curve also may be derived by calculation or experimentation. Because there is a family of torque-rotation curves for a given assembly due to friction variations, curve $T_T$, when derived experimentally, is developed by taking the average of several such curves for a particular type of assembly.

Curve $T_A$ is a typical actual torque-rotation curve for the assembly. This curve is derived "on-the-fly" as the particular assembly is being tightened by sensing the torque and rotation imparted to the threaded fastener to tighten the assembly.

Curves $T_A$ and $T_T$ are illustrated as being different to reflect the likelihood of different friction conditions from one tightening cycle to another of the same assembly, which will result in the generation of different torque-rotation curves for different tightening cycles of the same assembly. This situation illustrates the disadvantage of torque control apparatus mentioned previously. As an illustration of this disadvantage, if the tightening equipment is set to shut off at a given torque level $T_D$, in order to achieve, according to curves $T_T$ and P, the desired preload $P_D$ and, in fact, the actual torque-rotation curve for the tightening cycle is $T_A$, the fastener rotation will be taken to $\theta_A$ rather than the desired $\theta_D$. This will result in an induced preload $P_A$ rather than the desired preload $P_D$. The shaded area between $P_A$ and $P_D$ indicates the variation in induced loads in the threaded fastener for a variation in torque-rotation curves between $T_T$ and $T_A$.

Angle control tightening, also mentioned previously, is based on that portion of the preload-rotation curve where the two are linearly related. Knowing this relationship and knowing when it starts, a desired predetermined preload may be induced in the threaded fastener by imparting a controlled amount of rotation to the fastener. The problem, in the past, has been to determine the starting point for imparting this controlled amount of rotation. The prevalent practice is to sense a prescribed torque level and impart the fixed amount of rotation to the fastener starting at that point. For a prescribed torque level of $T_S$, for example, the respective starting points for imparting a tightening angle of $\theta_S$ are spaced apart by an angle between $\theta_1$ and $\theta_2$ which is equal to the spread on the $T_T$ and $T_A$ curves at the $T_S$ torque level. FIG. 1 shows the variation in induced loads in the shaded area between $P_D$ and $P_S$ when the same amount of rotation $\theta_S$ is imparted to a threaded fastener but the starting points vary between $\theta_1$ and $\theta_2$. As previously mentioned, U.S. Pat. Nos. 4,104,778 and 4,104,780 eliminate this potential variation somewhat by identifying a proper point for initiation of the measurement of rotation. This is accomplished by circuitry which senses the onset of the linear portion of the curve and starts the measurement of rotation from that point.

In accordance with the present invention, a value representative of the coefficient of friction in the threaded joint is obtained and the desired, predetermined preload to be induced in the threaded fastener is achieved as follows. A preload $P_L$ and a torque $T_L$ which induces preload $P_L$ are selected either by experimentation or calculation. Preload $P_L$ and torque $T_L$ are selected to be within the substantially linear tightening portion and preload $P_L$ is selected to be smaller than desired preload $P_D$. By specifying that preload $P_L$ and torque $T_L$ are within the substantially linear tightening portion, it is intended that they may be the preload and corresponding torque at the onset of the substantially linear tightening portion or a preload and corresponding torque after the onset of the substantially linear tightening portion. The present invention will be described initially with preload $P_L$ and torque $T_L$ selected after the onset of the substantially linear tighening portions of the preload-rotation and torque-rotation curves, respectively.

It should be noted that preload $P_L$ and the corresponding torque $T_L$ may be selected either by establishing preload $P_L$ and developing an average of the torques $T_L$ required to induce preload $P_L$ or by establishing torque $T_L$ and developing an average of the preloads $P_L$ induced by torque $T_L$. The invention will be described by using the former alternative.

After preload $P_L$ and torque $T_L$ are selected, the slope of the linear portion of the preload-rotation curve is derived either by calculation or experimentation. This slope represents the tension rate TR of the assembly and may be determined from the following relationship:

$$TR = \frac{P_E - P_L}{\theta_E - \theta_L} \quad (1)$$

Where:

$P_L$ is the established induced load at some point within the substantially linear portion of the preload-rotation curve $\theta_L$ is the angle at which the preload-rotation curve is equal to $P_L$ $P_E$ is the induced load at some point less than the elastic limit of the joint assembly (not shown)

$\theta_E$ is the angle at which the preload-rotation curve is equal to $P_E$ (not shown).

The desired, predetermined preload $P_D$ is related to the tension rate of the assembly as follows:

$$TR = \frac{P_D - P_L}{\theta_D - \theta_L} \quad (2)$$

Where:

$P_L$ and $\theta_L$ are as defined above in connection with Equation (1)

$\theta_D$ is the angle at which the desired, predetermined preload is developed The triangle in FIG. 1, defined by points D, E, and F, identifies the relationship set forth in Equation (2).

Assuming that the assembly being tightened exhibits a generally linear torque vs. rotation and preload vs. rotation relationship, torque and induced load are related according to the following general equation:

$$T = C_1 Pd \quad (3)$$

Where:

T is the torque imparted to the fastener $C_1$ is a factor representative of the coefficient of friction for the assembly and the geometry of the fastener P is the induced load in the fastener d is the pitch diameter of the fastener It is to be understood that Equation (3) is a simplification of the longer equation relating torque and induced load in a joint:

$$T = Pd\left(\frac{1}{2}\,\frac{1 + \pi fd \sec\beta}{\pi d - fl \sec\beta} + .625 f_c\right)$$

This equation is discussed, for example, in "Machine Design" by J. E. Shigley, McGraw-Hill Book Company (1956). The bracketed terms represent the coefficient of friction factor for a joint and are combined into a value "$C_1$" in Eq. (3). This simplification has been found to provide acceptable accuracy.

In accordance with the curves shown in FIG. 1, Eq. (3) may be rewritten as follows:

$$(T_F - T_L) = C_1 d(P_D - P_L) \quad (4)$$

Where:

$T_F$ is the final desired torque necessary to produce the desired predetermined preload $P_D$ $T_L$ is the average torque, within the substantially linear portion of the torque-rotation curve, which induces preload $P_L$ It should be pointed out that use of an average torque $T_L$ corresponding to the torque which induces load $P_L$ determined prior to the actual tightening cycle may result in small errors in the final desired tightening torque $T_F$ due to friction variations between the test joints and the actual joint being tightened. However, these errors are considered to be within acceptable limits compared to other tightening techniques and the magnitude of these errors is reduced as torque $T_L$ and preload $P_L$ approach the torque and preload at the onset of the substantially linear portions of the torque-rotation and preload-rotation curves, respectively.

Transposing Equation (2):

$$P_D = (TR)(\theta_D - \theta_L) + P_L \quad (5)$$

and substituting Equation (5) in Equation (4):

$$T_F - T_L = C_1 d(TR)(\theta_D - \theta_L) \quad \text{(b 6)}$$

Differentiating Equation (6):

$$dT/d\theta = C_1 d(TR) \quad (7)$$

When operating in the substantially linear tightening portion of curve $T_A$, $dT/d\theta$ is substantially constant.

$$dT/d\theta = M \quad (8)$$

Where:

M is the slope of the torque-rotation curve $T_A$ in the linear portion thereof

Substituting M in Equation (7) and transposing this Equation:

$$C_1 = \frac{M}{d(TR)} \quad (9)$$

Thus the value of "$C_1$", representing the coefficent of friction factor for the joint assembly, can be computed for the actual tightening cycle taking place. Knowledge of this value has utility, for example, in evaluating the effectiveness and consistency of different lubricants, and evaluating various fastener/joint materials in order to examine the galling effect produced by different material combinations.

Solving Equation (4) for $T_F$:

$$T_F = C_1 d(P_D - P_L) + T_L \quad (10)$$

The value of M may be determined "on-the-fly" as the fastener is driven and the assembly is tightened in accordance with the present invention by comparing the change in torque imparted to the fastener over a specified rotation angle through which the fastener is being rotated. The gradient curve $(dT_A)/(d\theta)$, as shown in FIG. 1, has a changing value during the non-linear tightening portion of the actual torque-rotation curve $T_A$ to the left of point X, and a substantially constant value during the substantially linear tightening portion of the actual torque-rotation curve. By determining in advance, using strain-gaged bolt tests, when the curve becomes linear, a torque value (such as $T_L$) can be established at which to measure the value of the gradient M.

Figure 2:
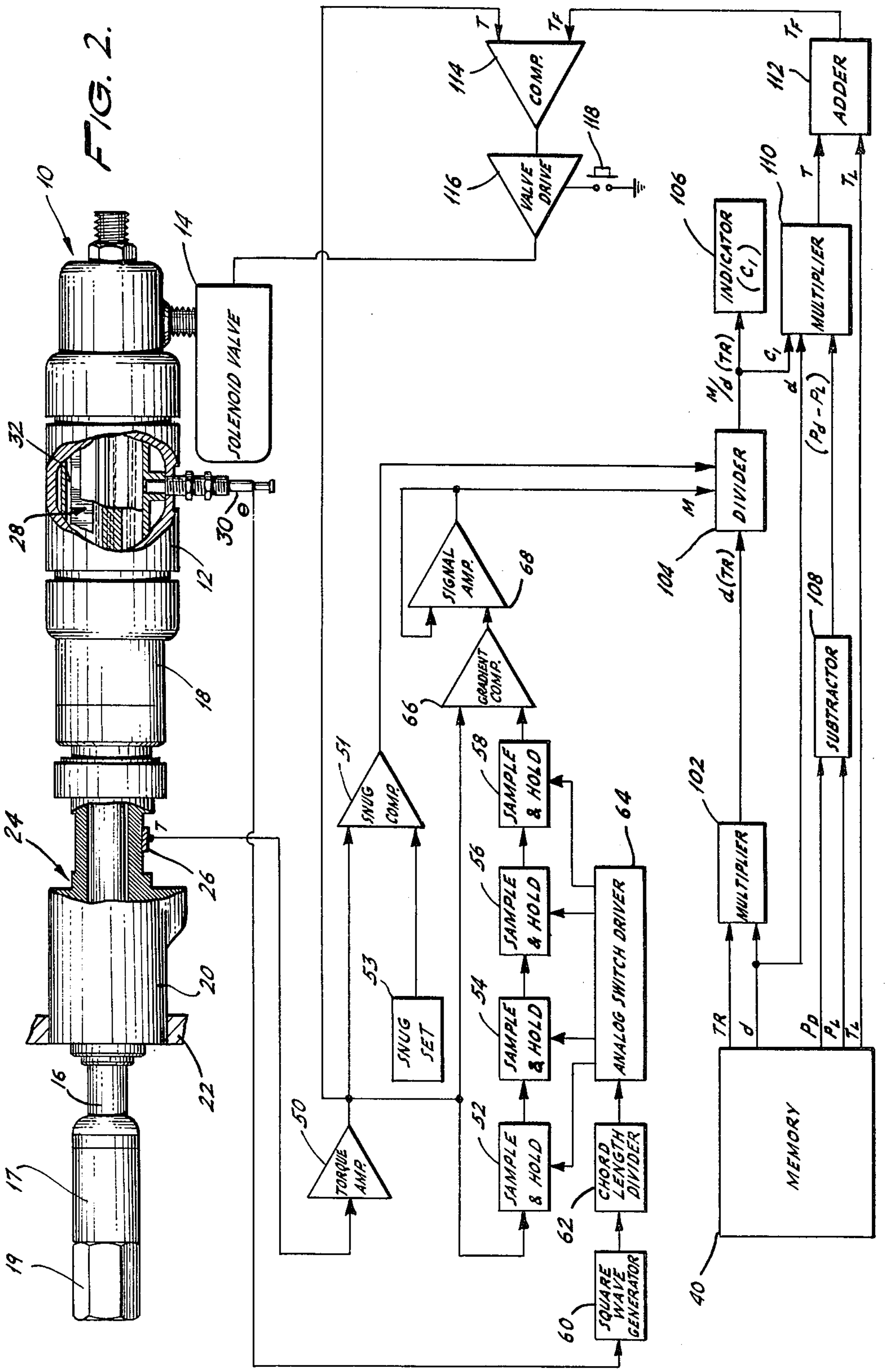
FIG. 2 shows one preferred embodiment of apparatus for determining dynamic friction and for tightening a threaded joint constructed in accordance with the present invention.

FIG. 2 illustrates a preferred embodiment of friction indicating and tightening apparatus constructed in accordance with the present invention. This apparatus includes driving means for imparting torque and rotation to a fastener to tighten an assembly held together by the fastener. The driving means may be a wrench 10, having a motor 12, the operation of which is controlled by a suitable electrically operated control valve 14, such as a solenoid valve, and which drives an output shaft 16 through a speed reducing gear box 18 so that the output shaft does not rotate at the same high speed of the motor. Wrench 10 can be of any conventional type and as is most common, motor 12 can be air powered with the flow of motive fluid being controlled by solenoid valve 14. It should be understood that motor 12 could also be electric, hydraulic or any combination of pneumatic, hydraulic or electric. The exact details of the wrench are not necessary for a proper understanding of the invention and, accordingly, a more specific description is not provided. Output shaft 16 carries an adapter 17 for attachment with a bit driver 19 and is mounted in a suitable rotary bearing assembly 20.

Mounted between gear box 18 and a rigid frame 22 on which bearing assembly 20 is preferably mounted, is a suitable transducer or torque cell 24 for generating a varying signal representative of the instantaneous torque being applied to the fastener. Torque cell 24 can be any of a variety of conventional devices and in the embodiment disclosed herein comprises a somewhat flexible annular member having strain gages 26 secured to its outer periphery, so that the reaction torque on the wrench is measured and an electrical signal is generated. The reaction torque is, of course, equal to and opposite the torque being applied to the fastener. Mounted on drive shaft 16 for rotation therewith and preferably within motor 12 is a suitable encoder 28 that cooperates with a proximity detector 30 for developing signals representative of the incremental angular displacement or rotation of the fastener. Encoder 28 can be any of a variety of suitable devices and in this embodiment includes a series of vanes 32 formed on its outer periphery, which are radially spaced from proximity detector 30. Proximity detector 30 senses the presence of metal and, thus, the passage of the vanes and develops an electrical signal representative of fixed increments of angular rotation. The size of the increments depends on the number of vanes 32 in motor 12 and the gear ratio of gear box 18. It should be understood that proximity probe 30 may be arranged to cooperate with one of the gears in gear box 18 in a similar manner. While examples of torque and rotation measuring devices have been described, it should be understood that any of a variety of readily available devices for accomplishing the noted result can be utilized in accordance with the invention.

The apparatus shown in FIG. 2 also includes means for supplying:

(1) a first preload signal representative of a desired, predetermined preload ($P_D$) which is to be induced in the fastener when the assembly being tightened by the driving means has been tightened to a desired degree;
(2) a second preload signal representative of a selected preload ($P_L$) within the substantially linear tightening portion of the preload-rotation curve;
(3) a torque signal representative of the average torque ($T_L$), within the substantially linear portion of the torque-rotation curve, which induces preload $P_L$;
(4) a tension rate signal representative of the tension rate (TR) of the assembly being tightened; and
(5) a signal representative of the pitch diameter of the fastener being tightened.

Such means may include, in part, a memory system 40 in which the inputs $P_D$, $P_L$, $T_L$, TR and d are stored. Memory system 40 may, in the preferred embodiment, consist of five conventional potentiometers which are set to represent the five inputs.

A control circuit is operatively associated with wrench 10 for determining the value representative of the coefficient of friction in the joint assembly and for controlling the tightening of the fastener. This control circuit includes a gradient calculating system that determines the instantaneous gradient or slope of the torque-rotation curve, which could be plotted on a graph, if desired, for the particular fastener being tightened, and develops an electrical signal representative thereof. The output signal T from torque cell 24, representative of the instantaneous torque being imparted to the fastener, is supplied to a torque amplifier 50 which amplifies the torque signal to a level at which it is compatible with the rest of the system. From amplifier 50, the torque signal is fed simultaneously to a snub comparator 51 which also receives a signal from a snug set circuit 53, and through shift register means which comprise a series of charge coupled devices in the form of sample and hold circuits 52, 54, 56 and 58. The shift register means are clocked by signals representative of fixed angular increments of rotation of the threaded fastener. Specifically, signals from proximity probe 30, which are in the form of spike-shaped pulses, are fed to a square wave generator 60 which shapes the signals and feeds the shaped signals through a chord length divider 62 to an analog switch driver 64 which sequentially clocks sample and hold circuits 52, 54, 56 and 58. Chord length divider 62 is a suitable divider circuit which electronically divides the pulses from square wave generator 60 by one, two, four, eight, sixteen or thirty-two so that every pulse, or every second pulse, or every fourth pulse, etc., is used to clock the shift register.

Analog switch driver 64, although not necessary, assures that each sample and hold circuit has discharged its stored signal before receiving a new signal. Accordingly, analog switch driver 64 sequentially clocks the sample and hold circuits, first clocking circuit 52, then circuit 54, then circuit 56, and finally circuit 58. Thus, sample and hold circuit 58 has discharged its stored signal prior to receiving a new signal from sample and hold circuit 56 and likewise for the remaining sample and hold circuits. The output from sample and hold circuit 58 is representative of torque a fixed increment of rotation prior to that particular instant and is fed to a gradient comparator 66 in the form of a conventional differential amplifier which also receives an input signal, representative of the instantaneous torque being applied to the fastener, directly from torque amplifier 50. Gradient comparator 66 subtracts its two input signals and develops and output signal representative of the instantaneous torque gradient M of torque rotation curve $T_A$. In particular, the two inputs to comparator 66 are samples of the torque signal taken at different rotational positions of the fastener, one being the torque at that particular position of the fastener and one, delayed by sample and hold circuits 52, 54, 56 and 58, being the torque at a previous position of the fastener. Thus, the output of comparator 66 represents the change in the torque signal over a fixed increment of rotation of the fastener. The gradient signal M from gradient comparator 66 is fed to a suitable signal amplifier 68 which amplifies the gradient signal to a magnitude compatible with the rest of the system.

From the foregoing, it is seen that the gradient signal M is developed by comparing the torques being applied to the fastener at different times to develop indications of the changes in torque over fixed increments of rotation imparted to the fastener. By selecting the appropriate division to be made in chord length divider 62, it is possible to adjust the chord length over which the gradient is being calculated. In this way, the apparatus may be adjusted to distinguish between actual torque changes and electrical and mechanical noise.

As previously mentioned, in order to insure that the gradient signal M is obtained in the substantially linear portion of the actual torque-rotation curve $T_A$, a torque value is established in advance at which to measure the value of the gradient M. This torque value (such as $T_L$, for example) is preset in snug set circuit 53, which could be in the form of a suitable potentiometer for providing the necessary signal representative of the desired torque level. This setting need not be exactly coincident with the beginning of the linear portion of curve $T_A$, but may be an approximation. For example, a signal representative of about 20% of the torque value expected at the yield point of the fastener would suffice. When the instantaneous torque signal from amplifier 50 exceeds that generated by snug set circuit 53, comparator 51 provides an output signal, the use of which will be described below.

Also included in the apparatus for determining dynamic friction is memory system 40, a multiplier circuit 102, a divider circuit 104 and an indicating device 106. The values of TR (tension rate) and d (pitch diameter of the fastener), which are stored in memory system 40, are fed as inputs to multiplier 102 whose output is the product d(TR) thereof. This product d(TR) is introduced as one input to divider 104 whose other input is the gradient value M from amplifier 68. As described above, the signal from snug comparator 51 is fed to divider 104 and must be present for the divider to compute the quotient M/(d(TR)) and provide an output signal. The output of divider 104, M/(d(TR)), is the value $C_1$ representative of the coefficient of friction in the threaded joint and is introduced into a suitable indicator 106, such as a visual readout or printer, for example, for display and/or recording purposes.

Also included in the tightening apparatus are means for determining the desired torque value $T_F$ defined by Equation (10). This value represents the computed torque level which is to be imparted to the threaded fastener to achieve the desired preload $P_D$. Memory 40 also stores the predetermined values of $P_D$, $P_L$ and $T_L$. Signals representative of $P_D$ and $P_L$ are fed to a subtraction circuit 108 whose output signal, which is representative of the difference therebetween $(P_D-P_L)$, is introduced along with signals representative of d from memory 40 and $C_1$ from divider 104 into a multiplication circuit 110. The output from multiplier circuit 110 $[C_1d(P_D-P_L)]$ is equal to a value T which must then be added to the average torque value $T_L$ from memory 40 in order to obtain the final desired torque value $T_F$. This function is accomplished in addition circuit 112 whose output is a signal representative of $T_F$ from Equation (10). Multiplier circuits 102 and 110, divider circuit 104, subtractor circuit 108 and addition circuit 112 are all of conventional construction and operation.

The tightening apparatus of FIG. 2 also includes comparison means in the form of a comparator 114 responsive to the instantaneous torque signal T from torque amplifier 50 and the desired torque signal $T_F$ developed by adder 112 from comparing these two input torque signals and for developing a control signal when the two are equal. As long as there is a difference between the two inputs to comparator 114, the comparator develops an output signal representative of this difference. When the two inputs to comparator 114 are the same, namely after the torque level imparted to the threaded fastener is equal to the desired tightening torque from adder 112, comparator 114 develops a distinct control signal. This control signal is fed to control means in the form of a valve drive circuit 116 which is operative to provide a signal to solenoid valve 14 to shut down the drive of wrench 10. Valve drive circuit 116 may be in the form of a suitable amplifier which amplifies the control signal to a level sufficient to cause solenoid valve 14 to shut down the drive of wrench 10. A reset switch 118 is provided to clear the circuits and prepare the tightening apparatus for a new tightening operation with another fastener.

Certain possible modifications to the FIG. 2 apparatus should be noted. Instead of providing separate inputs representative of the desired preload $P_D$ which is to be induced in the fastener and the selected load $P_L$, a single input, representative of the difference between these two preloads, may be supplied. This is possible since both of these preloads are known in advance and the subtraction operation performed by subtractor 108 may be performed manually. In such a case, subtractor 108 may be removed from the apparatus.

Also, because the tension rate TR and pitch diameter d are known in advance of the tightening operation, their product may be computed manually and introduced as a single input signal to divider 104. In this case multiplier 102 may be eliminated.

Having thus described a preferred embodiment of the present invention, some of the many advantages should be readily apparent. The dynamic friction apparatus provides a direct measure of the frictional condition in a threaded joint without having to add additional measuring devices, such as a load cell or load-indicating washer, which changes the characteristics of the joint and adds expense and complexity to the operation. The tightening apparatus is a relatively simple, economical, accurate and reliable system for tightening a fastener which utilizes readily available conventional components.

Figure 3:
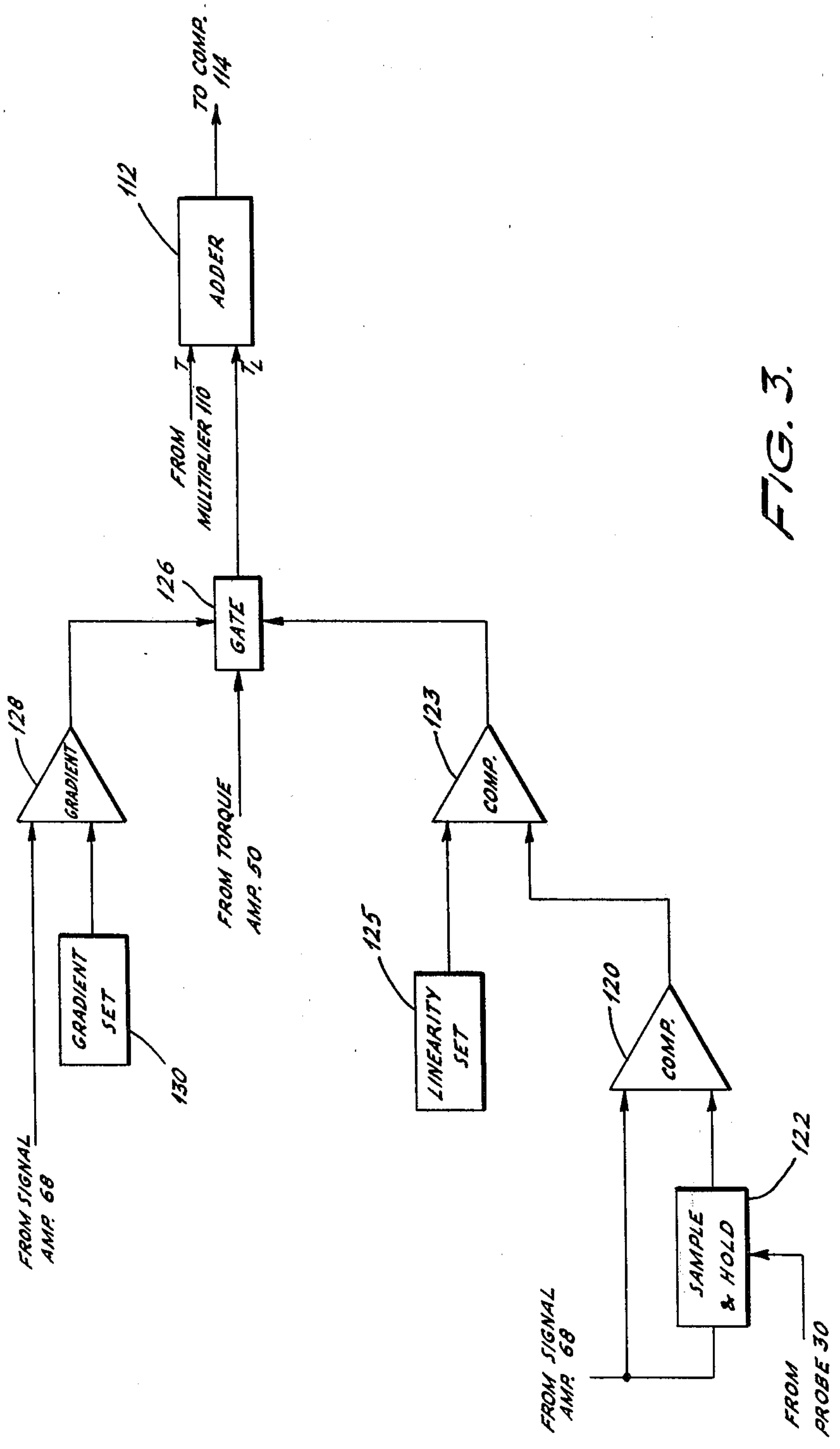
FIG. 3 shows a modification to the FIG. 2 apparatus.

FIG. 3 illustrates a modification which may be made to the FIG. 2 apparatus. Instead of selecting a preload $P_L$ and a torque $T_L$ after the onset of the substantially linear tightening portions of the preload-rotation and torque-rotation curves, respectively, the modification shown in FIG. 3 contemplates selecting preload $P_L$ at the onset of the substantially linear tightening portion of the preload-rotation curve and deriving torque $T_L$ by sampling the applied torque at the onset of the substantially linear tightening portion of the torque-rotation curve. This modification eliminates the need for prior testing to develop an average torque $T_L$ which induces selected preload $P_L$ and also provides greater accuracy in calculating the final desired tightening torque $T_F$ which will achieve the desired preload $P_D$.

Referring to FIG. 3, the output of signal amplifier 68 is supplied simultaneously to a comparator 120 and a sample and hold circuit 122 which is clocked by signals from proximity probe 30. Comparator 120 may be in the form of a conventional differential amplifier which subtracts its two inputs. The combination of comparator 120 and sample and hold circuit 122 serves to develop a gate signal at the onset of the substantially linear tightening portion of the torque-rotation curve. In particular, the two inputs to comparator 120 are samples of the gradient signal taken at different rotational positions of the fastener, one being the gradient at that particular position of the fastener and one, delayed by sample and hold circuit 122, being the gradient at a previous position of the fastener. Thus, the output of comparator 120 represents the change in the gradient signal over a fixed increment of rotation of the fastener. When operating in the substantially linear tightening portion of curve $T_A$, the gradient signal $(dT_A/(d\theta)$ is substantially constant. Therefore, if the two angle displaced gradient signal inputs to the comparator are the same, the subtraction operation performed by the comparator yields a zero and the onset of the substantially linear tightening portion is sensed. Comparator 120 is conditioned to provide a distinct output signal when this occurs.

As stated previously, the tightening curves shown in FIG. 1 are idealized representations of what actually occurs under practical conditions. In order to sense the onset of a substantially linear tightening portion rather than a truly linear tightening portion, comparator 120 may be conditioned to provide a gate signal when the change in the two gradient inputs to the comparator is less than a prescribed amount. In other words, if the gradient signal supplied to comparator 120 directly from signal amplifier 68 differs from the delayed gradient signal supplied to comparator 120 through sample and hold circuit 122 by less than a preset amount, the comparator is effective to sense the onset of a substantially linear gradient. Such a modification may be built into comparator 70 or yet another comparator 123 may be provided at the output of comparator 120. The gate signal developed by comparator 120 is compared against a reference established by a linearity set circuit 125 and when the gate signal is equal to or less than the reference, comparator 123 passes the gate signal through. Linearity set circuit 125 may be in the form of a suitable potentiometer.

The second torque component of Equation (10), namely the torque imparted to the threaded fastener at the onset of the substantially linear tightening portion of the torque-rotation curve $T_A$, is developed directly from the output of torque amplifier 50. In particular, the torque signal from torque amplifier 50 is supplied to a gate circuit 126 which is conditioned initially to prevent passage of the torque signal. However, when the gate signal from comparator 120 is developed at the onset of the substantially linear tightening portion of torque-rotation curve $T_A$, the torque signal at that time is passed by gate circuit 126 to adder 112 where this torque level is stored and added to the output from multiplier 110. The output from adder 112 is a signal representative of the tightening torque defined by Equation (10).

To assure that the output from comparator 114 does not inadvertently shut down the drive of wrench 10 during the non-linear tightening portion of the torque-rotation curve, gate circuit 126 receives an additional input signal from a gradient comparator 128. Instantaneous gradient signals are fred from signal amplifier 68 to gradient comparator 128 which also receives an input signal from a gradient set circuit 130. This circuit may be in the form of a suitable potentiometer. The gradient set level is selected by considering the gradient level at which the onset of the substantially linear tightening portion is estimated and the preload which is to be induced into the fastener when the assembly has been tightened to the desired degree. When the level of the instantaneous gradient from signal amplifier 68 exceeds the level set by gradient set circuit 130, gradient comparator 128 provides a signal to gate circuit 126 which allows the torque signal from torque amplifier 50 to be supplied to adder 112. With adder 112 conditioned to inhibit the development of an output signal until such time that an input to the adder is supplied from gate circuit 126, the drive of wrench 10 will not be shut down prematurely.

While in the foregoing there have been disclosed preferred embodiments of apparatus for determining dynamic friction and an associated tightening system for tightening threaded joints, in accordance with the present invention, various changes and modifications should be readily apparent to one skilled in the art and are within the intended scope of the invention as recited in the claims.

I claim:

1. A system for determining a value representative of the coefficient of friction in a threaded joint assembly comprising:

means for tigtening the joint assembly;

gradient calculating means for developing a gradient signal representative of the slope of a torque-rotation curve which could be plotted for the joint assembly being tightened;

first means for providing a signal representative of the product of the pitch diameter of a threaded fastener member of the joint assembly and the tension rate of the joint assembly; and computing means responsive to said gradient signal and said first means signal for computing the value representative of the coefficient of friction in the joint assembly and providing an output signal indicative thereof.

2. A system in accordance with claim 1 wherein said computing means includes dividing means for dividing said gradient signal by said first means signal, said dividing means output signal being said computing means output signal.

3. A system in accordance with claim 1 wherein said first means includes memory means for storing signals representative of the pitch diameter of the threaded fastener member and the tension rate of the joint assembly.

4. A system in accordance with claim 1, 2 or 3 further including indicating means for indicating said computing means output signal.

5. A system in accordance with claim 1, 2 or 3 for tightening the joint assembly to a desired preload, further including second computing means for computing a value representative of the desired torque necessary to produce the desired predetermined preload in the joint assembly and providing an output signal indicative thereof, said second computing means receiving said computing means output signal, the signal representative of the threaded member pitch diameter from said first means, a difference signal representative of the difference between the desired preload and a selected load at some point within the substantially linear portion of the preload-rotation curve and a signal representative of a selected torque at some point within the substantially linear portion of the torque-rotation curve which induces said selected load, said second computing means output signal being responsive to the input signals thereto.

6. A system in accordance with claim 5 wherein said first means provides said signals representative of the desired preload, the selected load and the selected torque.

7. A system in accordance with claim 5 wherein said second computing means includes subtraction means receiving said signals representative of the desired preload and the selected load for providing said difference signal.

8. A system in accordance with claim 5 wherein said second computing means includes multiplying means for multiplying said computing means output signal, the signal representative of the threaded member pitch diameter and said difference signal and providing an output signal, and addition means receiving said multiplying means output signal and said selected torque signal for providing an output signal indicative of the sum thereof, said addition means output signal being said second computing means output signal.

9. A system in accordance with claim 8 wherein said means for tightening the joint assembly includes wrench means for applying torque and imparting rotation to the threaded fastener member of the joint assembly.

10. A system in accordance with claim 9 further including means responsive to said second computing means output signal for discontinuing operation of said wrench means.

11. A system in accordance with claim 5 wherein said selected load is at some point on the preload-rotation curve greater than the load at which the curve becomes substantially linear and said selected torque is an average torque at some point on the torque-rotation curve greater than the torque at which the curve becomes substantially linear.

12. A system in accordance with claim 5 wherein said selected load is at the point on the preload-rotation curve at which the curve becomes substantially linear and said selected torque is the torque at the point on the torque-rotation curve at which the curve becomes substantially linear.

13. Apparatus for tightening a joint assembly including a threaded fastener to a desired preload comprising:

means for tightening the joint assembly by imparting torque and rotation to the fastener, the torque-rotation curve and the preload-rotation curve for the assembly each having a substantially linear tightening portion;

torque sensing means responsive to said means for tightening the joint assemby for developing a first torque signal representative of the torque imparted to the fastener;

angle sensing means responsive to said means for tightening the joint assembly for developing an angle signal representative of the rotation imparted to the fastener;

gradient calculating means for developing a gradient signal representative of the slope of the torque-rotation curve which could be plotted for the joint assembly being tightened;

first means for providing signals representative of the desired preload, a selected load at the onset of the substantially linear portion of the preload-rotation curve, the tension rate of the joint assembly, and the pitch diameter of the threaded fastener gate means responsive to said gradient signal for developing a gate signal at the onset of said substantially linear tightening portion, said gate means being operative to receive said first torque signal and output a selected torque signal representative of the torque imparted to the fastener at said onset of said substantially linear tightening portion;

computing means responsive to said gradient signal, said selected torque signal and said first means signals for computing an output signal representative of the desired torque necessary to produce the desired preload in the joint assembly.

14. Apparatus in accordance with claim 13 wherein said first means includes memory means for storing said first means signals.

15. Apparatus in accordance with claim 13 or 14 wherein said computing means includes first multiplying means receiving said tension rate and pitch diameter signals for providing an output signal indicative of the product thereof, dividing means receiving said gradient signal and said first multiplying means output signal for providing an output signal indicative of the quotient thereof, subtracting means receiving said desired preload and said selected load signals for providing an output signal representative of the difference therebetween, second multiplying means receiving said dividing means signal, said difference signal and said pitch diameter signal for providing an output signal indicative of the product thereof, and adding means receiving said second multiplying means output signal and said selected torque signal for providing an output signal indicative of the sum thereof, said adding means output signal being said computing means output signal representative of the desired torque necessary to produce the desired preload in the joint assembly.

16. Apparatus in accorance with claim 15 wherein said means for tightening the joint assembly includes wrench means, and further including torque sensing means responsive to said wrench means for developing a torque signal representative of the torque being applied to the fastener and angle sensing means responsive to said wrench means for developing an angle signal representative of the rotation being imparted to the fastener.

17. Apparatus in accordance with claim 16 further including comparison means responsive to said torque signal and said computing means output signal for comparing said two signals and for developing a control signal when said signals are essentially equal, and control means responsive to said control signal for supplying said control signal to said wrench means to stop said wrench means from imparting torque and rotation to the threaded fastener.

18. A method of determining a value representative of the coefficient of friction in a threaded joint assembly comprising the steps of:

determining the tension rate (TR) of the joint assembly;

providing the pitch diameter (d) of a threaded fastener member of the joint assembly;

tightening the joint assembly;

calculating the gradient (M) of a torque-rotation curve for the joint assembly being tightened during the substantially linear portion thereof; and computing on the fly the value representative of the coefficient of friction ($C_1$) as a function of said gradient, said pitch diameter and said tension rate.

19. A method in accordance with claim 18 wherein the step of computing said value representative of the coefficient of friction ($C_1$) includes the steps of dividing said gradient by the product of said pitch diameter and said tension rate [M/d(TR)].

20. A method in accordance with claim 19 further including the step of indicating said value representative of the coefficient of friction in the joint assembly.

21. A method of tightening a joint assembly including a threaded fastener to a desired preload comprising the steps of:

establishing a desired predetermined preload ($P_D$) which is to be induced in the joint assembly;

determining a selected load ($P_L$) at the onset of the substantially linear portion of the preload-rotation curve;

determing the tension rate (TR) of the joint assembly;

providing the pitch diameter (d) of the threaded fastener;

tightening the joint assembly by imparting torque and rotation to the fastener;

calculating the gradient (M) of the torque-rotation curve during the substantially linear portion thereof;

identifying said onset of said substantially linear tightening portion of said torque-rotation curve;

measuring a selected torque ($T_L$) imparted to the fastener at said onset of said substantially linear tightening portion;

computing a desired tightening torque ($T_F$) necessary to induce the desired predetermined preload in the joint assembly, as a function of said predetermined preload, said selected load, said gradient, said tension rate, said pitch diameter and said selected torque;

determining when said torque imparted to the fastener is equal to said desired tightening torque ($T_F$); and discontinuing tightening the joint assembly when said torque imparted to the fastener is equal to said desired tightening torque ($T_F$).

22. A method in accordance with claim 21 wherein the step of computing said desired tightening torque ($T_F$) includes the steps of dividing said gradient (M) by the product of said pitch diameter (d) and said tension rate (TR) to obtain [M/d(TR)], obtaining the difference between said predetermined preload ($P_D$) and said selected load ($P_L$), obtaining the product of $\{[M/d(TR)]\cdot(P_D-P_L)\cdot(d)\}$ and adding this product to the selected torque ($T_L$) to obtain the desired tightening torque ($T_F$).

* * * * *